United States Patent
Dai et al.

(10) Patent No.: US 11,618,705 B2
(45) Date of Patent: Apr. 4, 2023

(54) METHOD FOR ENHANCING METHANOGENESIS IN ANAEROBIC DIGESTION OF MUNICIPAL SLUDGE BY UTILIZING A FILTER SCREEN STRUCTURE

(71) Applicant: Tongji University, Yangpu District (CN)

(72) Inventors: Xiaohu Dai, Shanghai (CN); Lei Li, Shanghai (CN); Ying Xu, Shanghai (CN); Lipeng Dong, Shanghai (CN); Linke Zheng, Shanghai (CN); Bin Dong, Shanghai (CN); Lingling Dai, Shanghai (CN)

(73) Assignee: TONGJI UNIVERSITY, Yangpu District (CN)

( * ) Notice: Subject to any disclaimer, the term of this patent is extended or adjusted under 35 U.S.C. 154(b) by 0 days.

(21) Appl. No.: 17/043,518

(22) PCT Filed: Dec. 10, 2019

(86) PCT No.: PCT/CN2019/124403
§ 371 (c)(1),
(2) Date: Jul. 11, 2022

(87) PCT Pub. No.: WO2021/082199
PCT Pub. Date: May 6, 2021

(65) Prior Publication Data
US 2022/0340467 A1    Oct. 27, 2022

(30) Foreign Application Priority Data
Oct. 31, 2019   (CN) .......................... 201911053440.2

(51) Int. Cl.
*C02F 11/04* (2006.01)
*B01D 39/12* (2006.01)
*C02F 11/12* (2019.01)

(52) U.S. Cl.
CPC .............. *C02F 11/04* (2013.01); *B01D 39/12* (2013.01); *C02F 11/12* (2013.01)

(58) Field of Classification Search
CPC ........... C02F 11/04; C02F 11/12; B01D 39/12
(Continued)

(56) References Cited

FOREIGN PATENT DOCUMENTS

| CN | 101348314 A | 1/2009 |
|---|---|---|
| CN | 102140001 A | 8/2011 |

(Continued)

OTHER PUBLICATIONS

Machine-generated English translation of CN 106365404A, generated on Sep. 9, 2022.*
(Continued)

*Primary Examiner* — Fred Prince
(74) *Attorney, Agent, or Firm* — Barclay Damon LLP

(57) ABSTRACT

The disclosure relates to a method for enhancing methanogenesis in anaerobic digestion of municipal sludge by utilizing a filter screen structure, comprising: arranging a filter screen structure with titanium or titanium alloy as the framework and $Fe_3O_4$ as the coating in the anaerobic digestion system to accelerate the rate of hydrolysis and acidification, and increase the proportion of methane in biogas. Compared with the prior art, the disclosure increases the contact between $Fe_3O_4$ and anaerobic microorganisms by means of the screen structure; the stable crystal structure of $Fe_3O_4$ ensures the sustainability as an electron carrier while enriching electroactive microorganisms; titanium or titanium alloy, as a material with high strength, corrosion resistance, good biocompatibility, and good conductivity, can form a good match with $Fe_3O_4$ and assist in promoting the electron transfer; the disclosure has the advantages of low cost, high income, no need of repeated dosing and stable effect, and could strengthen the oxidation and decomposi- (Continued)

tion of organic matter in the anaerobic digestion, accelerate the rate of methanogenesis, and increase the gas production.

8 Claims, 3 Drawing Sheets

(58) Field of Classification Search
USPC .............................. 210/603, 612, 613, 631
See application file for complete search history.

(56) References Cited

FOREIGN PATENT DOCUMENTS

| CN | 104529116 A |   | 4/2015 |
|----|-------------|---|--------|
| CN | 106365404 A | * | 2/2017 |
| CN | 107236983 A |   | 10/2017 |
| CN | 110171876 A |   | 8/2019 |
| WO | WO 2012/123331 A1 |  | 9/2012 |

OTHER PUBLICATIONS

Chinese Office Action for CN 201911053440.2; Dated Jun. 12, 2020; 8 pages.
International Search Report for PCT/CN2019/124403; Dated Jul. 29, 2020; 5 pages.

* cited by examiner

METHOD FOR ENHANCING METHANOGENESIS IN ANAEROBIC DIGESTION OF MUNICIPAL SLUDGE BY UTILIZING A FILTER SCREEN STRUCTURE

TECHNICAL FIELD

The present disclosure relates to the technical field of municipal sludge treatment and organic matter resource utilization, and in particular relates to a method for enhancing methanogenesis in anaerobic digestion of municipal sludge by utilizing a filter screen structure.

BACKGROUND ART

In our country, with the rapid improvement of sewage treatment capacity, by the end of February, 2019, more than 5,500 municipal sewage treatment plants (excluding township sewage treatment plants and industries) have been built in cities nationwide, with a sewage treatment capacity of 204 million cubic meters per day, resulting in annual output of sludge over 40 million tons (calculated with a moisture content of 80%). Anaerobic digestion technology realizes resource recovery while promoting sludge reduction, stabilization, and harmlessness, and has good environmental and economic benefits, and thus it is a promising technology to help cope with climate change and achieve energy saving and emission reduction.

During the anaerobic digestion of municipal sludge, the organic matter in the sludge needs to undergo a series of steps such as hydrolysis, acidification, and acetification to turn into a small molecular organic matter such as acetic acid for methanogenesis. At present, the anaerobic digestion of sludge has problems of slow hydrolysis rate and low methanogenesis efficiency, etc. Researchers have conducted a lot of research on these problems. As the core of the anaerobic digestion process, a series of anaerobic microorganisms have attracted the attention of researchers. Iron is one of the essential elements for the growth of microorganisms, and mainly exists in the form of Fe(III) minerals in nature. Iron respiration is the oldest breathing method of life on the earth and an important part of the iron cycle in nature. Iron respiration refers to the process in which microorganisms use Fe(III) oxides as electron acceptors to oxidize organic matter and release electrons while reducing Fe(III) to Fe(II) and obtain energy. This process is also called dissimilatory iron reduction process. It has been studied that the addition of $Fe_3O_4$ in the process of hydrolysis and acidification helps enrich the dissimilatory iron-reducing bacteria to promote the oxidative decomposition of organic matter, thereby providing abundant substrates for the methane-producing section, and improving the efficiency of anaerobic digestion.

In addition, Lovley et al. first proposed a new electron transport pathway in the interaction system of anaerobic microorganisms, namely direct interspecies electron transfer (DIET). Compared with the interspecies hydrogen transfer or interspecific formic acid transfer in the traditional anaerobic digestion process, the direct interspecies electron transfer greatly accelerates the rate of electron transfer and strengthens the process of reducing carbon dioxide to methane, so that the proportion of methane in the biogas produced by anaerobic digestion can theoretically be increased to more than 75%. The addition of conductive materials can serve as a channel for electron transfer to promote the formation of DIET. It has been studied that the addition of nanometer $Fe_3O_4$ in the process of anaerobic digestion can enrich electroactive microorganisms to strengthen the direct interspecies electron transfer between syntrophic microorganisms during anaerobic methanation, thereby accelerating the rate of methanogenesis by anaerobic digestion and at the same time increasing the proportion of methane in biogas.

In summary, it has been proved that the use of $Fe_3O_4$ and conductive materials to enhance anaerobic digestion of municipal sludge is an effective strategy. Nano-magnetite is used to improve the efficiency of anaerobic methanogenesis, as described in patent "Method for improving the efficiency of anaerobic methanogenesis by using nano-magnetite" (CN103773807A). Nanometer $Fe_3O_4$ is used to improve the activity of methanogens, as described in patent "Method for improving the activity of methanogens and methanogenic efficiency during anaerobic digestion by using nanometer $Fe_3O_4$" (CN104529116A). Both methods have certain effects but at the same time have defects and drawbacks that cannot be ignored. While adding nano-magnetite or nanometer $Fe_3O_4$ by external source to increase the processing cost, it is necessary to consider the adverse effects of multiple factors such as mass transfer and nanoparticle coagulation on the biochemical reaction process, and at the same time, both the loss and subsequent recycling of iron are economic burdens that cannot be ignored.

Therefore, it is necessary to find a way to use $Fe_3O_4$ with stable effect, lower cost, and no need of repeated dosing, to effectively enhance methanogenesis in anaerobic digestion of municipal sludge.

SUMMARY

To overcome the problems of slow hydrolysis rate and low methanogenesis efficiency in the anaerobic digestion of municipal sludge in the prior art, an object of the present disclosure is to provide a method for enhancing methanogenesis in anaerobic digestion of municipal sludge by utilizing a filter screen structure, which accelerates the rate of hydrolysis and acidification, and increases the ratio and efficiency of methanogenesis.

The object of the present disclosure can be achieved by the following technical solutions:

The present disclosure provides a method for enhancing methanogenesis in anaerobic digestion of municipal sludge by utilizing a filter screen structure, comprising: arranging a filter screen structure with titanium or titanium alloy as the framework and $Fe_3O_4$ as the coating in the anaerobic digestion system to accelerate the rate of hydrolysis and acidification of the sludge, and increase the proportion of methane in biogas.

In one embodiment, the framework is a woven mesh made of titanium or titanium alloy wire, and the woven mesh has a mesh of 10-200, a wire diameter of 0.25 mm-0.5 mm, and a mesh size of 0.1 mm-2 mm.

In one embodiment, $Fe_3O_4$ coating is prepared by a way of micro-arc oxidation, in which water-soluble aminated $Fe_3O_4$ nanoparticles, calcium salt, phosphate salt and weak acid is used as solutes to form an electrolyte, and $Fe_3O_4/TiO_2$ coating is generated on the surface of titanium or titanium alloy.

In one embodiment, the anaerobic digestion system has an anaerobic digestion reactor, and the filter screen structure is laid at the feed inlet of the anaerobic digestion reactor.

In one embodiment, the feed inlet is arranged in the middle and lower part of the anaerobic digestion reactor, and the filter screen structure is laid below the feed inlet in the anaerobic digestion reactor near the feed inlet.

In one embodiment, the method uses the digested sludge that operates stably in an anaerobic digestion reactor as an inoculum, and the municipal sludge as a substrate to produce methane by anaerobic fermentation under the conditions of pH=7.0, the temperature of 35-65° C., and a stirring speed of 80-120 r/min.

In one embodiment, the substrate is the remaining sludge in the secondary settling tank or the sludge subjected to gravity concentration and dehydration, and has a total solid (Total Solid, TS) content of 2% to 8%, and a volatile solid (Volatile Solid, VS) content of 51.9% to 70.8%.

In one embodiment, the anaerobic digestion reactor is operated in batch, semi-continuous or continuous mode.

Compared with the prior art, the present disclosure has the following advantages:

(1) The present disclosure included a filter screen structure with titanium or titanium alloy as the framework and $Fe_3O_4$ as the coating, by which the contact between $Fe_3O_4$ and anaerobic microorganisms is increased. In addition, $Fe_3O_4$ has a stable crystal structure, which ensures the sustainability as an electron carrier while enriching electroactive microorganisms.

(2) Titanium or titanium alloy, as a material with high strength, corrosion resistance, good biocompatibility, and good conductivity, can form a good match with $Fe_3O_4$ and assist in promoting the electron transfer.

(3) The present disclosure has the advantages of low cost and high income, no need of repeated dosing, and stable effect, and could strengthen the oxidation and decomposition of organic matter in the anaerobic digestion, accelerate the rate of methanogenesis, and increase the gas production.

BRIEF DESCRIPTION OF THE DRAWINGS

FIG. 4 shows the X-ray diffraction (XRD) spectrum of $Fe_3O_4$ before and after anaerobic treatment, wherein FIG. 4(a) shows the spectrum of $Fe_3O_4$ before anaerobic treatment, and FIG. 4(b) shows the spectrum of $Fe_3O_4$ after anaerobic treatment.

DETAILED DESCRIPTION OF THE EMBODIMENTS

Figure 3:
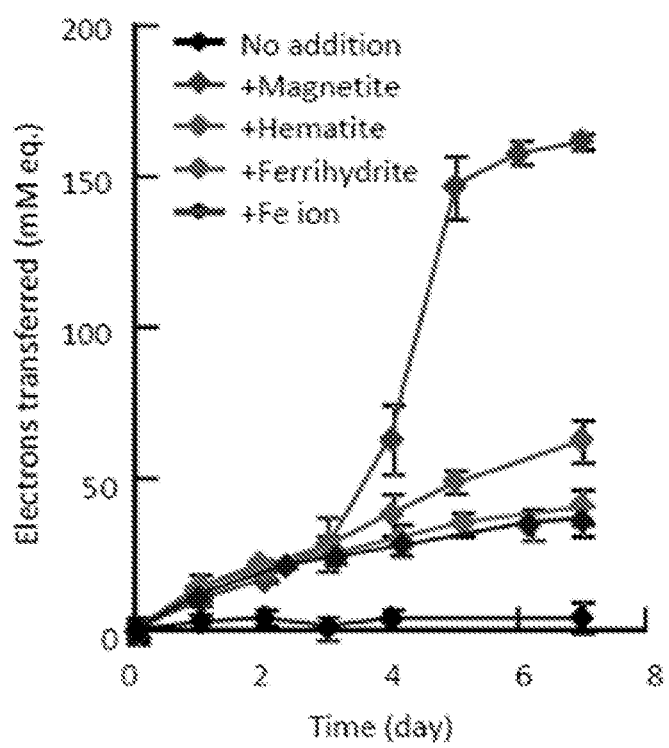
FIG. 3 is a graph showing the influence of different iron materials on the amount of electron transfer.

FIG. 3 shows the influence of the related different iron materials on the amount of electron transfer. From top to bottom, FIG. 3 shows the influence of adding magnetite, hematite, ferrihydrite and iron atoms, and not adding above materials to the system on the amount of electron transfer. It can be seen that the experimental group with $Fe_3O_4$ added has the highest electron transfer rate, which reflects the advantages of $Fe_3O_4$ in accelerating the electron transfer rate and promoting the progress of biochemical reactions.

The present disclosure provides a method for enhancing methanogenesis in anaerobic digestion of municipal sludge by utilizing a filter screen structure, comprising: arranging a filter screen structure with titanium or titanium alloy as the framework and $Fe_3O_4$ as the coating in the anaerobic digestion system to accelerate the rate of hydrolysis and acidification, and increase the proportion of methane in biogas.

In one embodiment, the framework is a woven mesh made of titanium or titanium alloy wire, and the woven mesh has a mesh of 10-200, a wire diameter of 0.25 mm-0.5 mm, and a mesh size of 0.1 mm-2 mm.

In one embodiment, $Fe_3O_4$ coating is prepared by a method of micro-arc oxidation, in which water-soluble aminated $Fe_3O_4$ nanoparticles, calcium salt, phosphate salt and weak acid is used as solutes to form an electrolyte, and $Fe_3O_4/TiO_2$ coating is generated on the surface of titanium or titanium alloy.

In one embodiment, the anaerobic digestion system has an anaerobic digestion reactor, and the filter screen structure is laid at the feed inlet of the anaerobic digestion reactor.

In one embodiment, the feed inlet is arranged in the middle and lower part of the anaerobic digestion reactor, and the filter screen structure is laid below the feed inlet in the anaerobic digestion reactor near the feed inlet.

In one embodiment, the method uses the digested sludge that operates stably in an anaerobic digestion reactor as an inoculum, and the municipal sludge as a substrate to produce methane by anaerobic fermentation under the conditions of pH=7.0, the temperature of 35-65° C., and a stirring speed of 80-120 r/min.

In one embodiment, the substrate is the remaining sludge in the secondary settling tank or the sludge subjected to gravity concentration and dehydration, and has a total solid (Total Solid, TS) content of 2% to 8%, and a volatile solid (Volatile Solid, VS) content of 51.9% to 70.8%.

In one embodiment, the anaerobic digestion reactor is operated in batch, semi-continuous or continuous mode.

The present disclosure will be described in detail below with reference to the drawings and specific examples.

Example 1

Figure 1:
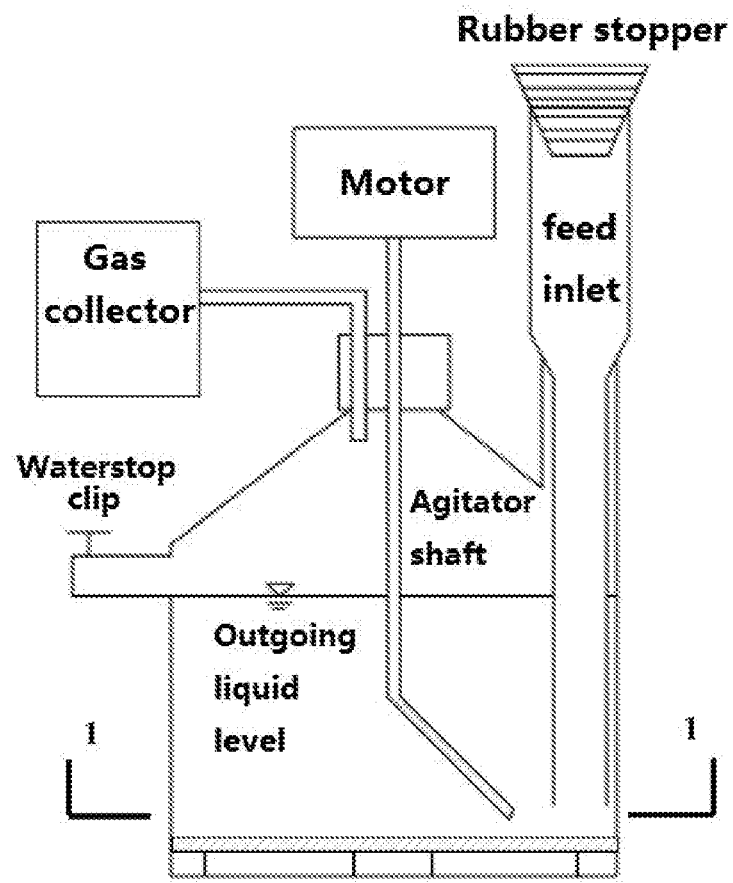
FIG. 1 is a schematic diagram of an anaerobic digestion experimental device with a filter screen structure in Example 1.
Figure 2:
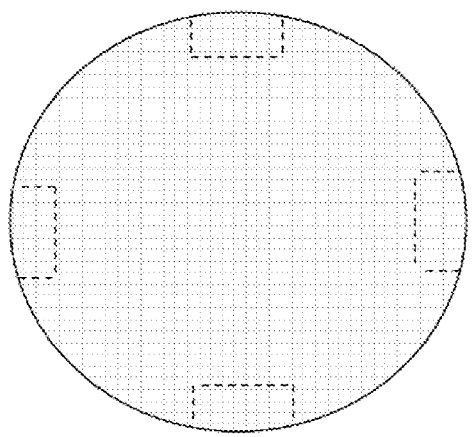
FIG. 2 is a cross-sectional schematic view of section 1-1 in FIG. 1.

In the batch methanogenesis experiment, a method for enhancing methanogenesis in anaerobic digestion of municipal sludge was implemented. The remaining sludge in the secondary settling tank (VS=51.9%-70.8%, TS=1.8%-5.1%) was used as the substrate, and the anaerobic digestion sludge in the reactor that operates stably (VS=35.6%-47.9%, TS=2.5%-5.2%) was used as inoculation mud. A batch methanogenesis experiment was performed in a 500 mL serum bottle. The experimental device was shown in FIG. 1. The cross-sectional schematic view of section 1-1 in FIG. 1 was shown in FIG. 2. It can be seen from FIG. 2 that in this example, four brackets were provided along the circumferential direction on the side wall of the serum bottle to support the filter screen structure (the shaded part in FIG. 2), the feed tube was inserted from the upper part of the serum bottle and the feed inlet extended into the serum bottle.

In an experimental group, a filter screen structure with titanium mesh as the framework and $Fe_3O_4$ as the coating was placed in the middle of the serum bottle, while in a control group, a filter screen structure was not equipped, and at the same time a blank group was set to eliminate the influence of the inoculated mud. The experiment was carried out in a shaker in an air bath with the temperature of 37-55° C. at a speed rate of 80-120 r/min During the experiment, the gas production and ratio were monitored, and before and after anaerobic digestion, the TS and VS were measured.

Compared with the control group in this example, the experimental group with a titanium mesh coated with $Fe_3O_4$ increased the gas production rate of the system and reached the maximum gas production at 13 days (the control group was 17 days), increased the proportion of methane gas in gas production from 63% to more than 75%, accelerated the rate of hydrolysis and acidification effectively, and increased the proportion of methane.

Example 2

In the semi-continuous methanogenesis experiment, a method for enhancing methanogenesis in anaerobic digestion of municipal sludge was implemented. The sludge subjected to gravity concentration (VS=51.9%-70.8%, TS=3.8%-5.1%) was used as the substrate, and the anaerobic digestion sludge in the reactor that operates stably (VS=35.6%-47.9%, TS=2.5%-5.2%) was used as inoculation mud. A semi-continuous methanogenesis experiment was performed in a reactor with a working volume of 2 L.

In an experimental group, a filter screen structure with titanium mesh as the framework and $Fe_3O_4$ as the coating was placed at the 0.5 L position (near the feed inlet) of the reactor, while in a control group, a filter screen structure was not equipped. The semi-continuous reactors of the experimental group and the control group were first added with 2 L of inoculum mud, and were operated under the following conditions: 200 mL feeding and 200 mL outgoing per day, and SRT=10 d. The reactors were heated by a water bath with the temperature of 37-55° C., while being stirred at a rate of 80-120 r/min, and the stirring is stopped for 1 minute every 1 minute. During the experiment, the contents of TS, VS, and VFA (volatile fatty acids) of the feeding and outgoing materials were monitored, and the gas production and ratio were determined.

Compared with the control group in this example, the experimental group with a semi-continuous reactor with a filter screen structure had a shortened start-up time, accelerated the rate of methanogenesis of 18.4%, had no accumulated VFA, increased the proportion of methane in the gas production from 65% to 78%, and maintained stable operation.

Example 3

In the continuous methanogenesis experiment, a method for enhancing methanogenesis in anaerobic digestion of municipal sludge was implemented.

The remaining sludge in the secondary settling tank (VS=51.9%-70.8%, TS=1.8%-5.1%) was used as the substrate, and the anaerobic digestion sludge in the reactor that operates stably (VS=35.6%-47.9%, TS=2.5%-5.2%) was used as inoculation mud. A continuous methanogenesis experiment was performed in a reactor with a working volume of 4 L.

In an experimental group, a filter screen structure with titanium mesh as the framework and $Fe_3O_4$ as the coating was placed at the 0.8 L position (near the feed inlet) of the reactor, while in a control group, a filter screen structure was not equipped. The semi-continuous reactors of the experimental group and the control group were first added with 4 L of inoculum mud, and started up by continuous feeding and outgoing, with SRT=20d. The reactor were heated by a water bath with the temperature of 37-55° C., while being stirred at a rate of 80-120 r/min, and the stirring is stopped for 2 minute every 1 minute. During the experiment, the contents of TS, VS, and VFA in the feeding and outgoing materials were monitored, and the gas production and ratio were determined.

Compared with the control group in this example, the experimental group had been successfully started up in the first SRT, while the accumulated VFA appeared in the control group. The experimental group showed stronger adaptability and recovered to stability faster than the control group when the two reactors were operating stably and under reducing the SRT from 20d to 15d and then further reducing to 10d. It has been proved that the reactor equipped with the filter screen with the titanium mesh as the framework and $Fe_3O_4$ as the coating has a stable operation effect.

Figure 4:
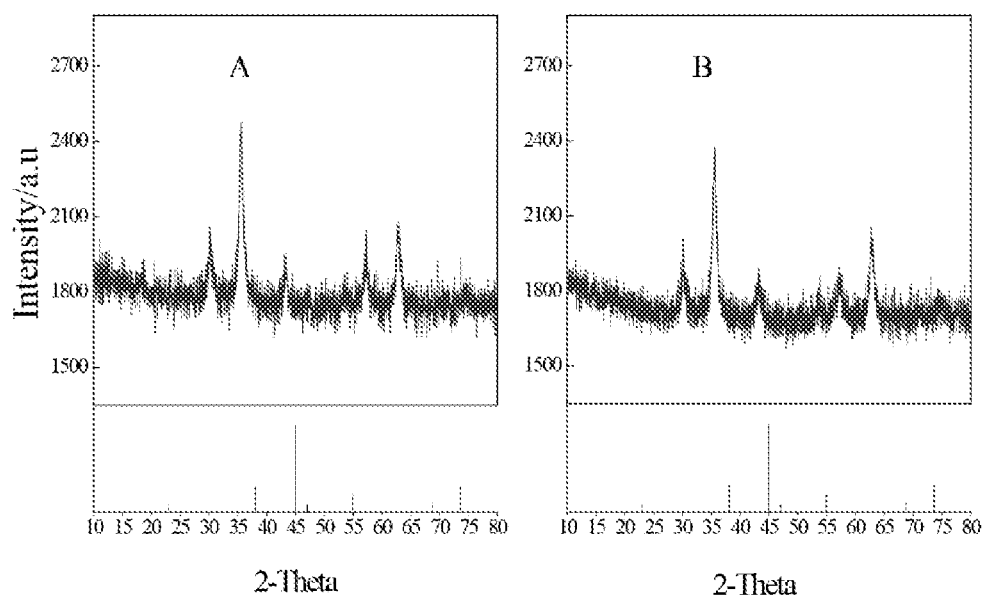

The X-ray diffraction (XRD) spectrum of $Fe_3O_4$ before and after anaerobic treatment was shown in FIG. 4. Comparing FIG. 4($a$) and FIG. 4($b$), it can be seen that the crystal form of $Fe_3O_4$ remains well before and after the reaction, showing that it is stable in physico-chemical property and can be reused.

The foregoing description for the embodiments is to facilitate the understanding and use of the present disclosure by those skilled in the art. Those skilled in the art can obviously make various modifications to these embodiments and apply the general principles described herein to other embodiments without creative work. Therefore, the present disclosure is not limited to the above-mentioned embodiments. According to the content of the present disclosure, all improvements and modifications made by those skilled in the art without departing from the scope of the present disclosure should fall within the protection scope of the present disclosure.

What is claimed is:

1. A method for enhancing methano genesis in anaerobic digestion of municipal sludge by utilizing a filter screen structure, comprising: arranging a filter screen structure with titanium or titanium alloy as a framework and $Fe_3O_4$ as a coating in an anaerobic digestion system to accelerate a rate of hydrolysis and acidification, and increase a proportion of methane in biogas.

2. The method for enhancing methanogenesis in anaerobic digestion of municipal sludge by utilizing a filter screen structure according to claim 1, wherein the framework is a woven mesh made of titanium or titanium alloy wire, and the woven mesh has a mesh of 10-200 and a wire diameter of 0.25 mm-0.5 mm.

3. The method for enhancing methano genesis in anaerobic digestion of municipal sludge by utilizing a filter screen structure according to claim 1, wherein the $Fe_3O_4$ coating is prepared by a way of micro-arc oxidation, in which water-soluble aminated $Fe_3O_4$ nanoparticles, calcium salt, phosphate salt and weak acid are used as solutes to form an electrolyte, and an $Fe_3O_4/TiO_2$ coating is generated on the surface of the titanium or titanium alloy.

4. The method for enhancing methanogenesis in anaerobic digestion of municipal sludge by utilizing a filter screen structure according to claim 1, wherein the anaerobic digestion system has an anaerobic digestion reactor, and the filter screen structure is laid at a feed inlet of the anaerobic digestion reactor.

5. The method for enhancing methanogenesis in anaerobic digestion of municipal sludge by utilizing a filter screen structure according to claim 4, wherein the feed inlet is arranged in the middle and lower part of the anaerobic digestion reactor, and the filter screen structure is laid below the feed inlet in the anaerobic digestion reactor near the feed inlet.

6. The method for enhancing methanogenesis in anaerobic digestion of municipal sludge by utilizing a filter screen structure according to claim 4, wherein the method uses digested sludge that operates stably in an anaerobic digestion reactor as an inoculum, and municipal sludge as a substrate to produce methane by anaerobic fermentation under the conditions of pH=7.0, the temperature of 35-65° C., and a stirring speed of 80-120 r/min.

7. The method for enhancing methanogenesis in anaerobic digestion of municipal sludge by utilizing a filter screen structure according to claim 6, wherein the substrate is remaining sludge in a secondary settling tank or sludge subjected to gravity concentration and dehydration, and has a total solid content of 2% to 8%, and a volatile solid content of 51.9% to 70.8%.

8. The method for enhancing methano genesis in anaerobic digestion of municipal sludge by utilizing a filter screen structure according to claim 1, wherein an anaerobic digestion reactor is operated in batch, semi-continuous or continuous mode.

\* \* \* \* \*

UNITED STATES PATENT AND TRADEMARK OFFICE
CERTIFICATE OF CORRECTION

PATENT NO. : 11,618,705 B2
APPLICATION NO. : 17/043518
DATED : April 4, 2023
INVENTOR(S) : Xiaohu Dai et al.

Page 1 of 1

It is certified that error appears in the above-identified patent and that said Letters Patent is hereby corrected as shown below:

In the Claims

Claim 1 (Column 6 Line 28) - "methano genesis" should be "methanogenesis";
Claim 3 (Column 6 Line 41) - "methano genesis" should be "methanogenesis";
Claim 8 (Column 7 Line 10) - "methano genesis" should be "methanogenesis".

Signed and Sealed this
Twenty-second Day of August, 2023

Katherine Kelly Vidal
*Director of the United States Patent and Trademark Office*